(12) United States Patent
Davies et al.

(10) Patent No.: US 9,490,540 B1
(45) Date of Patent: Nov. 8, 2016

(54) PATCH ANTENNA

(71) Applicant: Hand Held Products, Inc., Fort Mill, SC (US)

(72) Inventors: Richard Lewis Davies, Cambridgeshire (GB); Emiliano Mezzarobba, Cambridge (GB)

(73) Assignee: Hand Held Products, Inc., Fort Mills, SC (US)

( * ) Notice: Subject to any disclaimer, the term of this patent is extended or adjusted under 35 U.S.C. 154(b) by 0 days.

(21) Appl. No.: 14/843,207

(22) Filed: Sep. 2, 2015

(51) Int. Cl.
| | | |
|---|---|---|
| *H04B 1/38* | (2015.01) | |
| *H04L 5/16* | (2006.01) | |
| *H01Q 9/04* | (2006.01) | |
| *H01Q 19/10* | (2006.01) | |
| *H01Q 1/48* | (2006.01) | |
| *H04B 10/40* | (2013.01) | |

(52) U.S. Cl.
CPC .............. *H01Q 9/0407* (2013.01); *H01Q 1/48* (2013.01); *H01Q 19/10* (2013.01); *H04B 10/40* (2013.01)

(58) Field of Classification Search
CPC ...... H01Q 9/0407; H01Q 19/10; H01Q 1/48; H04B 10/40; G01S 19/21
USPC .............. 375/219, 220, 222; 701/469; 343/700 MS
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Phuong Phu
(74) *Attorney, Agent, or Firm* — Additon, Higgins & Pendleton, P.A.

(57) ABSTRACT

A terrestrial transceiver is described, which is operable for exchanging RF signals with communication satellites. The transceiver has a patch antenna sensitive to signals within an L-Band RF range and operable for providing a gain to the RF signals. A metallic reflector of a characteristic dimension is operable for shaping a pattern of the RF gain of the patch antenna. A printed circuit board assembly (PCBA) has a dielectric substrate, an electronic component disposed upon the substrate, and a hole penetrating the substrate and disposed substantially within a central region thereof. Based on the dimension characteristic of the reflector and on a positioning and/or a dimension of the hole, the RF gain diverges over an angle from a boresight of the patch antenna.

16 Claims, 8 Drawing Sheets

(56) References Cited

U.S. PATENT DOCUMENTS

| | | |
|---|---|---|
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |

(56) References Cited

U.S. PATENT DOCUMENTS

| | | |
|---|---|---|
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2004/0027290 A1* | 2/2004 | Arvidsson ............ H01Q 9/0407 343/700 MS |
| 2007/0063048 A1 | 3/2007 | Havens et al. |
| 2007/0233383 A1* | 10/2007 | Churan .................. G01S 19/21 701/469 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |

(56) References Cited

U.S. PATENT DOCUMENTS

| | | |
|---|---|---|
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et 31.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

U.S. Appl. No. 14/533,319 for Barcode Scanning System Using Wearable Device With Embedded Camera filed Nov. 5, 2014 (Todeschini); 29 pages.

U.S. Appl. No. 14/748,446 for Cordless Indicia Reader With a Multifunction Coil for Wireless Charging and EAS Deactivation, filed Jun. 24, 2015 (Xie et al.); 34 pages.

U.S. Appl. No. 29/528,590 for Electronic Device filed May 29, 2015 (Fitch et al.); 9 pages.

U.S. Appl. No. 14/519,249 for Handheld Dimensioning System With Measurement-Conformance Feedback filed Oct. 21, 2014 (Ackley et al.); 36 pages.

U.S. Appl. No. 29/519,017 for Scanner filed Mar. 2, 2015 (Zhou et al.); 11 pages.

U.S. Appl. No. 14/398,542 for Portable Electronic Devices Having a Separate Location Trigger Unit for Use in Controlling an Application Unit filed Nov. 3, 2014 (Bian et al.); 22 pages.

U.S. Appl. No. 14/405,278 for Design Pattern for Secure Store filed Mar. 9, 2015 (Zhu et at.); 23 pages.

U.S. Appl. No. 14/590,024 for Shelving and Package Locating Systems for Delivery Vehicles filed Jan. 6, 2015 (Payne); 31 pages.

U.S. Appl. No. 14/568,305 for Auto-Contrast Viewfinder for an Indicia Reader filed Dec. 12, 2014 (Todeschini); 29 pages.

(56) References Cited

OTHER PUBLICATIONS

U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.

* cited by examiner

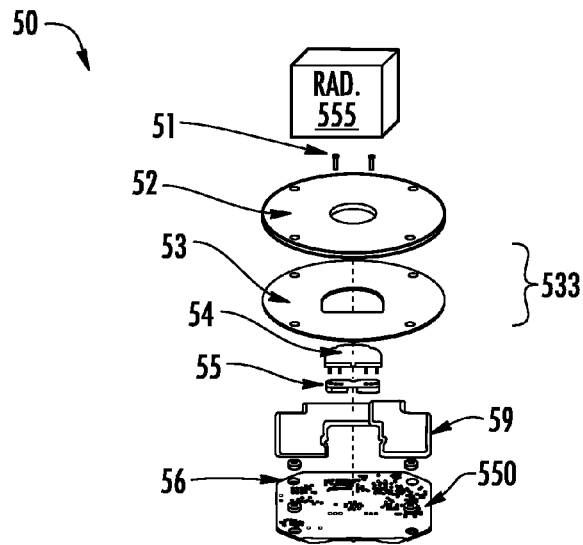
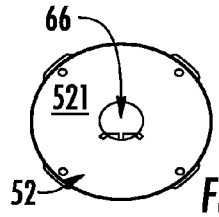
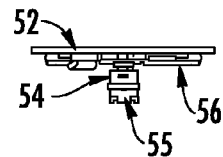
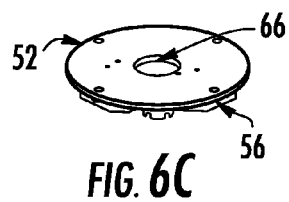
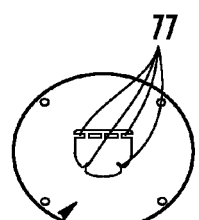
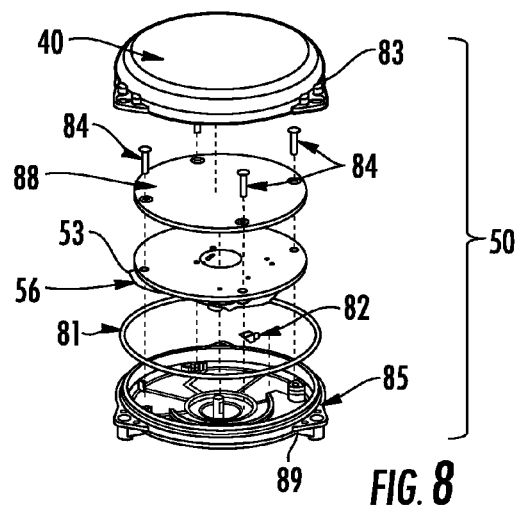

PATCH ANTENNA

TECHNOLOGY FIELD

The present invention relates to communication. More particularly, an embodiment of the present invention relates to interfaces for coupling terrestrial transceivers communicatively to satellites.

BACKGROUND

Generally speaking, satellites are launched into earth orbit for various applications relating to terrestrial, nautical, aeronautical, civil, and commercial communication, navigation, exploration, and observation, scientific research, and others. The satellites transmit radio frequency (RF) signals related to their operations. The satellite RF signals may be collected, interpreted, and processed by terrestrial satellite transceivers (transmitter/receivers) operable for exchanging signals with the satellites or other entities.

Communications satellites are operable for relaying information from a transmission source to transceivers in telecommunication related applications. Global communication networks and services may be provided, sustained, and supported by a communication satellite constellation, which comprises a plurality of individual communication satellites. Communication networks are operable with the satellite constellations to provide global telephone and data services of various kinds to users of portable and/or mobile transceiver terminals.

The portable/mobile transceiver terminals comprise antenna components, with which they may connect and exchange signals with the satellites. One or more terrestrial ground stations may participate in the communications. The communications may relate to messages and other traffic with which assets may be tracked and monitored, which may be moved in commerce or other endeavors.

Satellite terminals installed on the tracked assets support the messaging, tracking, and monitoring. For example, the SAT-202™ satellite terminal Satellite terminal (commercially available from the Honeywell Global Tracking™ subsidiary of Honeywell International™, Inc., a corporation in New Jersey) comprises a multi-purpose satellite terminal that may be installed on tracked assets. The SAT-202™ terminals are operable for automatically selecting an available satellite within a satellite constellation, and regularly transmitting its location, telemetry data, and message data thereto over wireless data links.

Satellite transceivers comprise an antenna operable as an interface for exchanging RF signals with the communication satellites. The SAT-202™ transceiver terminals exchange signals with the satellites over the L-Band between one Gigahertz (1 GHz) and two (2) GHz (inclusive) of the RF spectrum. The transceiver may comprise a patch antenna, which may achieve circular polarization by quadrature excitation of two linearly polarized ports. For example, the SAT-202 satellite transceiver comprises an L-band patch antenna with circular polarization that provides significant gain over low elevation angles and a frequency range spanning 1525 Megahertz (MHz) to 1661 MHz, inclusive.

Typically, antennae used in the satellite transceivers are enclosed within a radome and comprise two or more printed circuit board assemblies (PCBAs). The radomes typically comprise a weather resistant plastic material, which is transparent over the antenna RF range. The PCBAs comprise one or more electronic components disposed over a printed circuit board (PCB), which comprises a dielectric substrate and a network of conductive horizontal traces and/or vertical interconnect accesses ("vias"). The PCBAs, the PCB substrates thereof, and the attachment of the plastic radome during assembly of the antenna represent nontrivial expenses, which are typically reflected in the cost of the satellite transceivers.

For example, patch antennae in typical satellite transceivers may comprise internal coaxial cable couplers, as well as circuit components operable for the quadrature excitation of two linearly polarized ports to achieve circular polarization. In some transceivers, the polarizing circuit components may be disposed on a dedicated PCB, with associated cost and fabrication complexity issues. The quality of the circular polarization may be sensitive to the fabrication issues, and cross-polarization near the horizon may approach excessive levels. Left-hand polarization associated with this effect may cause signal fading at low elevation angles.

Therefore, a need exists for a satellite transceiver antenna that provides significant gain over a wide angle from an axis of maximum radiated power, and over a wide range of terrestrial locations world-wide for exchanging signals from geostationary communication satellites. A need also exists to implement the satellite transceiver antenna with right-hand circular polarization and to avoid interference associated with left-hand polarization. Further, a need exists to reduce complexity and costs related to components and fabrication of the satellite transceiver antenna, relative to existing conventional approaches.

SUMMARY

Accordingly, in one aspect, example embodiments of the present invention embrace a satellite transceiver antenna that provides significant gain over a wide angle from its boresight (axis of maximum radiated power), and globally over a wide range of terrestrial locations world-wide for exchanging signals from geostationary communication satellites. An example embodiment relates to implementing a satellite transceiver antenna with right-hand circular polarization, which avoids interference associated with left-hand polarization. Further, example embodiments of the present invention reduce complexity and costs related to components and fabrication of the satellite transceiver antenna, relative to existing conventional approaches.

A terrestrial transceiver is described, which is operable for exchanging RF signals with one or more communication satellites. The terrestrial transceiver comprises a patch antenna sensitive to signals within an L-Band RF range and operable for providing a gain to the RF signals. The patch antenna comprises a reflector. The reflector comprises a metallic material of a characteristic dimension and is operable for shaping a pattern of the RF gain of the patch antenna. Further, the transceiver comprises at least one printed circuit board assembly (PCBA).

The PCBA comprises a dielectric substrate, at least one electronic component disposed upon the dielectric substrate, and a hole penetrating the dielectric substrate and disposed substantially within a central region thereof. Based on the dimension characteristic of the reflector and on one or more of a positioning or a dimension of the hole, the RF gain diverges over an angle from a boresight of the patch antenna.

The terrestrial transceiver may also comprise a modulator/demodulator (modem) communicatively coupled to the patch antenna and operable for modulating and for demodulating the RF signals.

The terrestrial transceiver may also comprise a coupler assembly. The coupler assembly may comprise a pair of pins, each comprising a conductive material. The pair of pins is operable for coupling signals within the RF range between the patch antenna and the at least one electronic component of the PCBA. The coupler assembly also comprises a screen cover comprising a conductive material and operable for providing a ground connection between the modem and a ground plane of the patch antenna. Further, the coupler assembly comprises at least one spacer, which comprises a dielectric material.

The at least one spacer may comprise an antenna spacer operable for providing an electrical insulation between the modem and the ground plane of the patch antenna. The at least one spacer may also (or alternatively) comprise a screen spacer operable for providing one or more of an electrical insulation, or a mechanical support for the screen cover.

The terrestrial transceiver may also comprise a radome. The radome comprises a material transparent to the RF radiation and is operable for protectively housing the patch antenna within an operating environment of the transceiver. The reflector is suspended within the radome.

The metallic material of the suspended reflector may comprise a stamped metal. The characteristic dimension of the suspended reflector may comprise a shape configured over two spatial dimensions. A frequency bandwidth characteristic of the patch antenna may relate to the configured shape of the suspended reflector.

The terrestrial transceiver may also comprise a component operable for providing a first linear excitation to a first port of a pair of ports, a second linear excitation to a second port of the pair of ports wherein the second linear excitation is provided in a quadrature relationship to the first port of the pair. A circular polarization pattern is imparted to the patch antenna by the quadrature pair of excitations. In an example embodiment, a left-handed polarization of the antenna is rejected over low elevation angles within the RF operating range of the antenna.

The component operable for providing a first linear excitation and the second linear excitation may comprises a splitter, such as a Wilkinson splitter. Further, the excitation component may relate to the at least one electronic component disposed upon the dielectric substrate of the at least one PCBA.

The terrestrial transceiver may also comprise at least a second PCBA. The at least second PCBA may comprise a PCBA operable for providing a ground plane for the patch antenna, which has a radiating element coupled to the patch antenna and operable for radiating the RF signals thereto. The at least second PCBA may also (or alternatively) comprise a substrate. The substrate comprises a dielectric material and is operable for insulating the patch antenna electrically.

In another aspect, an example embodiment of the present invention relates to a fabrication process. An example embodiment of the present invention relates to a method for fabricating a terrestrial satellite transceiver operable for exchanging RF signals with a satellite, such as the transceiver summarized above. In an example embodiment, the fabrication method comprises assembling at least one PCBA.

The assembly of the PCBA comprises penetrating a dielectric substrate with a hole disposed substantially within a central region thereof and disposing at least one electronic component on the dielectric substrate.

A patch antenna is attached to the PCBA. The patch antenna comprises a reflector and is sensitive to signals within an L-Band RF range and operable for providing a gain to the RF signal. The reflector may comprise a metallic material. A shape is configured for a metallic reflector over two spatial dimensions. A frequency bandwidth characteristic of the patch antenna relates to the configured shape of the reflector.

The metallic reflector is operable for shaping a pattern of the RF gain of the patch antenna. Based on the shape configured over the two dimensions of the reflector and on a positioning, and/or on a dimension of the hole disposed in the at least one PCBA, the RF gain diverges over an angle from a boresight of the patch antenna.

An example embodiment of the present invention relates to a terrestrial transceiver product, which is implemented by a process such as the fabrication process summarized above. The transceiver product may comprise or correspond to the terrestrial satellite transceiver, which is also summarized above.

In yet another aspect, an example embodiment of the present invention relates to a satellite communication network. In an example embodiment, the satellite communication network comprises a satellite constellation. The satellite constellation comprises a plurality of communication satellites.

Each of the communication satellites is deployed in a geosynchronous, geostationary earth orbit (GEO). The satellite communication network also comprises one or more terrestrial transceivers operable for exchanging RF signals with one or more of the plurality of communication satellites.

The one or more terrestrial transceivers comprise a patch antenna sensitive to signals within an L-Band RF range and operable for providing a gain to the RF signals. The patch antenna comprises a reflector. The reflector comprises a metallic material of a characteristic dimension and is operable for shaping a pattern of the RF gain of the patch antenna. Further, the one or more terrestrial transceivers comprise at least one PCBA.

The PCBA comprises a dielectric substrate, at least one electronic component disposed upon the dielectric substrate, and a hole penetrating the dielectric substrate and disposed substantially within a central region thereof wherein. The RF gain diverges over an angle from a boresight of the patch antenna based on the dimension characteristic of the reflector, and on a positioning and/or a dimension of the hole. The transceiver may comprise or correspond to the terrestrial satellite transceiver summarized above.

The foregoing summary is presented by way of example, and not limitation, as a conceptual prelude to the following detailed description of example embodiments and each figure (FIG.) of the accompanying drawing, referred to therein.

BRIEF DESCRIPTION OF THE DRAWINGS

FIG. 5 depicts an exploded view of a portion of an example terrestrial transceiver, according to an example embodiment of the present invention;

FIG. 6A depicts a top view of an example PCB, according to an example embodiment of the present invention;

FIG. 6B depicts a lateral view of the example PCB, according to an example embodiment of the present invention;

FIG. 6C depicts a view of the example PCB partly from a side and partly from the top, according to an example embodiment of the present invention;

FIG. 7A depicts a top view of an example antenna spacer, according to an example embodiment of the present invention;

FIG. 7B depicts a lateral view of the example antenna spacer, according to an example embodiment of the present invention;

FIG. 8 depicts an exploded view of an example terrestrial transceiver, according to an example embodiment of the present invention;

DETAILED DESCRIPTION OF EXAMPLE EMBODIMENTS

Figure 1:
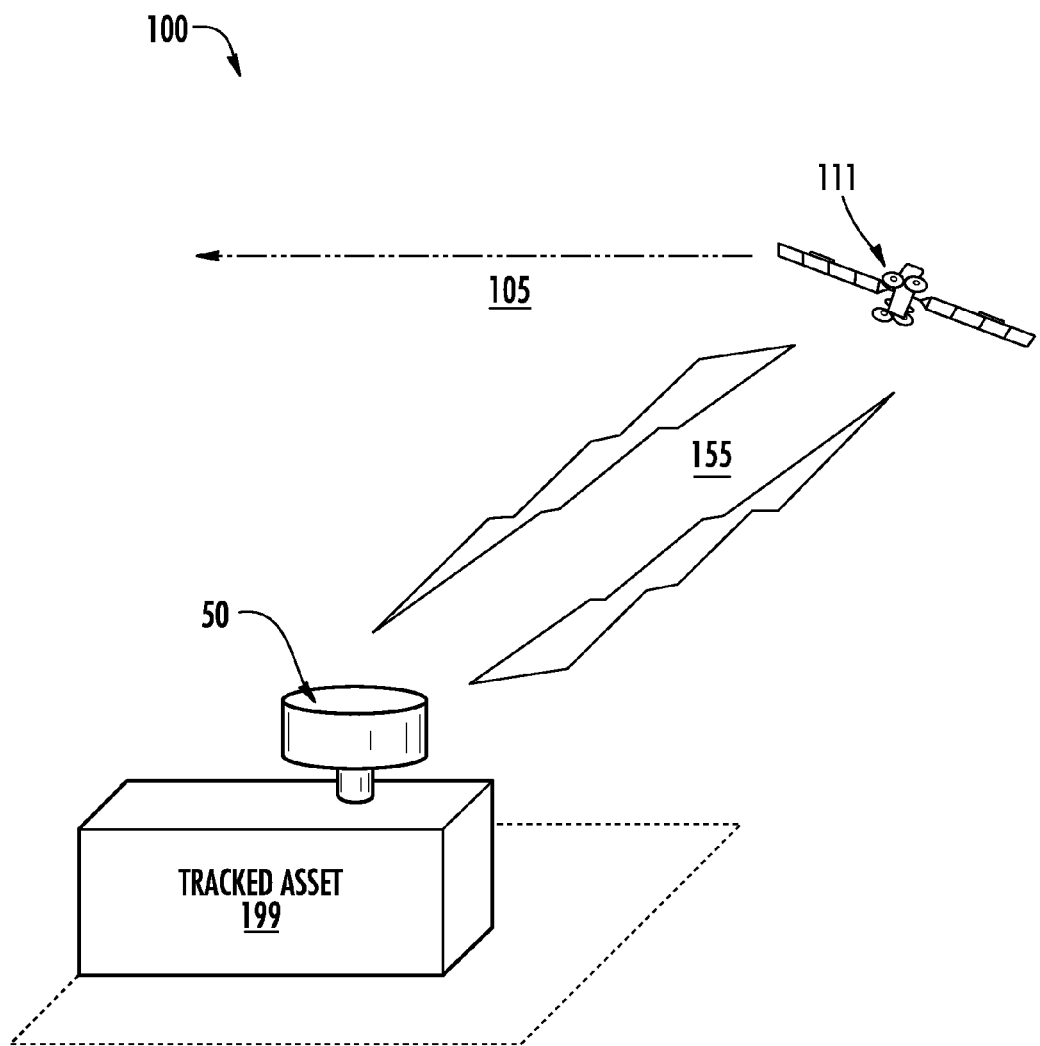
FIG. 1 depicts a first view of example satellite communication network, according to an example embodiment of the present invention.

Example embodiments of the present invention are described in relation to a terrestrial transceiver, which is operable for exchanging RF signals with one or more communication satellites. The terrestrial transceiver comprises a patch antenna sensitive to signals within an L-Band RF range and operable for providing a gain to the RF signals. The patch antenna comprises a reflector. The reflector comprises a metallic material of a characteristic dimension and is operable for shaping a pattern of the RF gain of the patch antenna. Further, the transceiver comprises at least one PCBA.

The satellite transceiver antenna described herein provides significant gain over a wide angle from its boresight, which comprises its axis of maximum radiated power, and globally over a wide range of terrestrial locations worldwide for exchanging signals from geostationary communication satellites. An example embodiment relates to implementing a satellite transceiver antenna with right-hand circular polarization, which avoids interference associated with left-hand polarization. Further, example embodiments of the present invention reduce complexity and costs related to components and fabrication of the satellite transceiver antenna, relative to existing conventional approaches.

Overview.

An example embodiment of the present invention relates to a terrestrial transceiver, which is operable for exchanging RF signals with one or more communication satellites. The terrestrial transceiver comprises a patch antenna sensitive to signals within an L-Band RF range and operable for providing a gain to the RF signals. The patch antenna comprises a reflector. The reflector comprises a metallic material of a characteristic dimension and is operable for shaping a pattern of the RF gain of the patch antenna. Further, the transceiver comprises at least one PCBA.

The PCBA comprises a dielectric substrate, at least one electronic component disposed upon the dielectric substrate, and a hole penetrating the dielectric substrate and disposed substantially within a central region thereof. Based on the dimension characteristic of the reflector and on one or more of a positioning or a dimension of the hole, the RF gain diverges over an angle from a boresight of the patch antenna.

The terrestrial transceiver may also comprise a modem communicatively coupled to the patch antenna and operable for modulating and for demodulating the RF signals.

The terrestrial transceiver may also comprise a coupler assembly. The coupler assembly may comprise a pair of pins, each comprising a conductive material. The pair of pins is operable for coupling signals within the RF range between the patch antenna and the at least one electronic component of the PCBA. The coupler assembly also comprises a screen cover comprising a conductive material and operable for providing a ground connection between the modem and a ground plane of the patch antenna. Further, the coupler assembly comprises at least one spacer, which comprises a dielectric material.

The at least one spacer may comprise an antenna spacer operable for providing an electrical insulation between the modem and the ground plane of the patch antenna. The at least one spacer may also (or alternatively) comprise a screen spacer operable for providing one or more of an electrical insulation, or a mechanical support for the screen cover.

The terrestrial transceiver may also comprise a radome. The radome comprises a material transparent to the RF radiation and is operable for protectively housing the patch antenna within an operating environment of the transceiver. The reflector is suspended within the radome.

The metallic material of the suspended reflector may comprise a stamped metal. The characteristic dimension of the suspended reflector may comprise a shape configured over two spatial dimensions. A frequency bandwidth characteristic of the patch antenna may relate to the configured shape of the suspended reflector.

The terrestrial transceiver may also comprise a component operable for providing a first linear excitation to a first port of a pair of ports, a second linear excitation to a second port of the pair of ports wherein the second linear excitation is provided in a quadrature relationship to the first port of the pair. A circular polarization pattern is imparted to the patch antenna by the quadrature pair of excitations. In an example embodiment, a left-handed polarization of the antenna is rejected over low elevation angles within the RF operating range of the antenna.

The component operable for providing a first linear excitation and the second linear excitation may comprises a splitter, such as a Wilkinson splitter. Further, the excitation component may relate to the at least one electronic component disposed upon the dielectric substrate of the at least one PCBA.

The terrestrial transceiver may also comprise at least a second PCBA. The at least second PCBA may comprise a PCBA operable for providing a ground plane for the patch antenna, which has a radiating element coupled to the patch antenna and operable for radiating the RF signals thereto. The at least second PCBA may also (or alternatively) comprise a substrate. The substrate comprises a dielectric material and is operable for insulating the patch antenna electrically.

Example Satellite Communication Network.

An example embodiment of the present invention relates to a satellite communication network. FIG. 1 depicts a first view of example satellite communication network 100, according to an example embodiment of the present invention.

Figure 2:
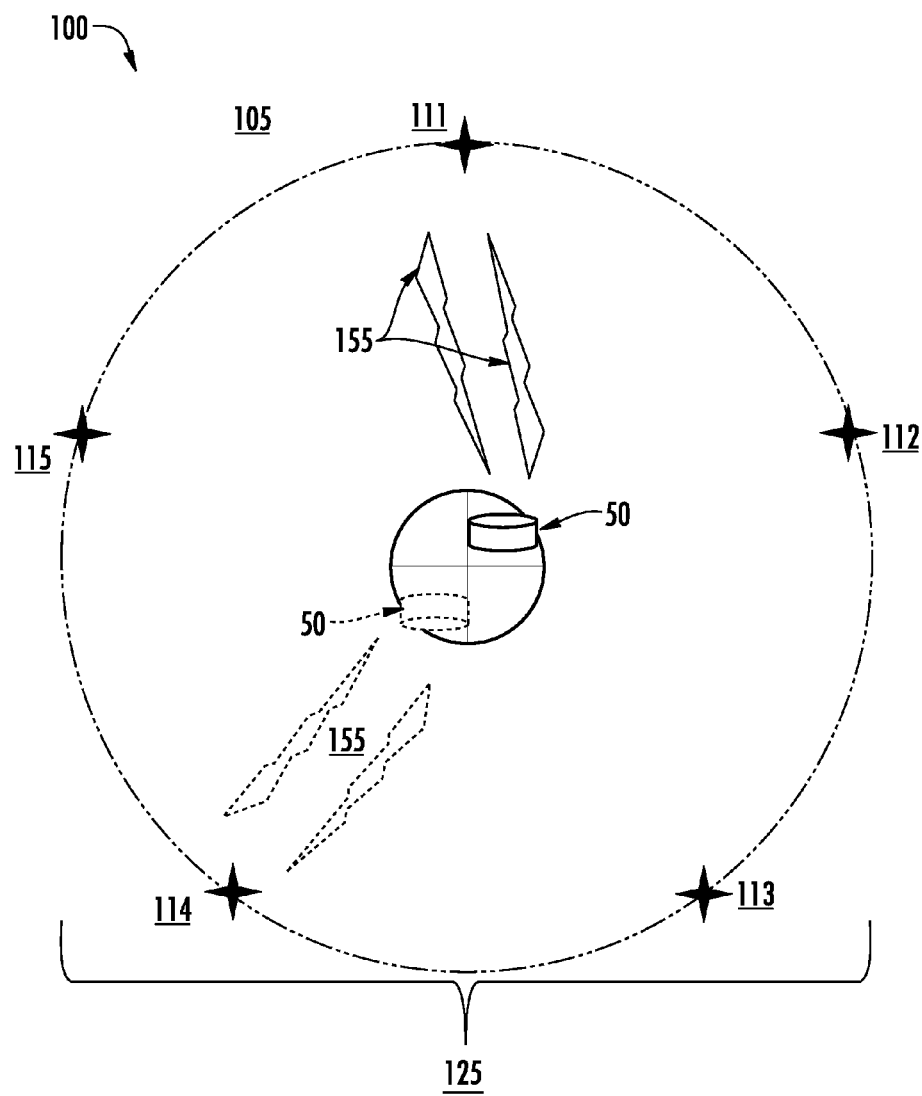
FIG. 2 depicts a second view of example satellite communication network, according to an example embodiment of the present invention.

In an example embodiment, the communication network comprises a constellation (125; FIG. 2) of communication satellites in a geosynchronous, geostationary earth orbit (GEO) 105. The satellite constellation comprises a communication satellite 111.

A tracked asset 199 comprises a terrestrial satellite transceiver 50. The transceiver 50 is operable for exchanging RF signals 155 with the satellite 111 (and other satellites of the constellation). The transceiver 50 is operable as a transceiver and as a transmitter in relation to the exchange of the RF signals 155 with the satellite 111 and other satellites of the constellation. Thus, the transceiver 50 comprises transceiver related functionality, operability and capability.

The RF signals 155 may comprise communication signals relating to LDRS, data, messaging, telephony, telemetry, geopositioning, and navigation and others and may allow tracking and other reports relating to the tracked asset 199. Using the LDRS, the satellite communication network 100 is operable for tracking, monitoring, messaging, and telemetry of vessels, vehicles, aircraft, cargoes, containers, personnel and various other items represented by the tracked asset 199, which may be moved in relation to commerce or other endeavors. The transceiver 50 installed on the tracked asset 199 supports the messaging, tracking, monitoring, and telemetry features.

The tracked asset 199 represents a terrestrial item, which may comprise a cargo, cargo item, container, trailer, barge, structure, vehicle, and others. The vehicle may be operable over one or more transport medium (e.g., water, air, land, etc.). The tracked asset 199 may even represent a living thing such as a person, animal, or group. The tracked asset 199 is disposed or deployed over a terrestrial surface. The terrestrial surface may comprise land, water, a structure (such as a building), stack, or a deck, cargo bay, or other portion of a vehicle.

FIG. 2 depicts a second view of the example satellite communication network 100, according to an example embodiment of the present invention. The satellite constellation 125 comprises a plurality of communication satellites 111 through 115, inclusive.

Each communication satellite of the constellation 125 is deployed in substantially circular geosynchronous, geostationary earth orbit (GEO) 105. Each of the satellites of the constellation 125 thus orbits earth in space at an altitude of approximately 22,236 statute miles (35,786 kilometers) above mean sea level, "eastward" over a substantially equatorial plane, and with a period of approximately 23 hours 56 minutes and 4 seconds and in synchronism with the earth sidereal rotational period.

An example embodiment may be implemented in which the constellation 125 represents the INMARSAT™ constellation of communication satellites, or a constellation with similar capabilities and characteristics. The INMARSAT™ constellation comprises at least five (5) telecommunication satellites 111, 112, 113, 114, and 115. The satellites of the constellation 125 orbit the earth in a GEO (represented by the GEO 125) and operated by INMARSAT™ (also known as the "International Maritime Satellite Organization," a public company doing business in Great Britain). The INMARSAT™ communications satellite constellation and networks provide global telephone and data services of various kinds to users of portable and/or mobile transceiver terminals.

The portable/mobile transceiver terminals comprise antenna components, with which they may connect to the satellites through one or more terrestrial ground stations. For example, a low data rate service (LDRS) is operable over the INMARSAT™ constellation and networks for tracking, monitoring, messaging, and telemetry of vessels, vehicles, aircraft, cargoes, containers, personnel and various assets (represented by the tracked assets 199) that may be moved in relation to commerce or other endeavors.

The satellite communication network 100 also comprises one or more terrestrial transceivers, represented by the transceiver 50 and described in relation thereto. The transceiver 50 is operable for exchanging RF signals with one or more of the plurality of communication satellites.

In a first terrestrial location, the transceiver 50 exchanges the RF signals 155 with the satellite 111. As the transceiver 50 moves over the terrestrial surface, it may exchange the RF signals 155 with one or more of the other satellites (e.g., 114, etc.) of the constellation 125. The transceiver 50 comprises a patch antenna 30. The patch antenna 30 comprises a reflector 33, which may be suspended in a radome 40.

Example Terrestrial Satellite Transceiver.

Figure 3:
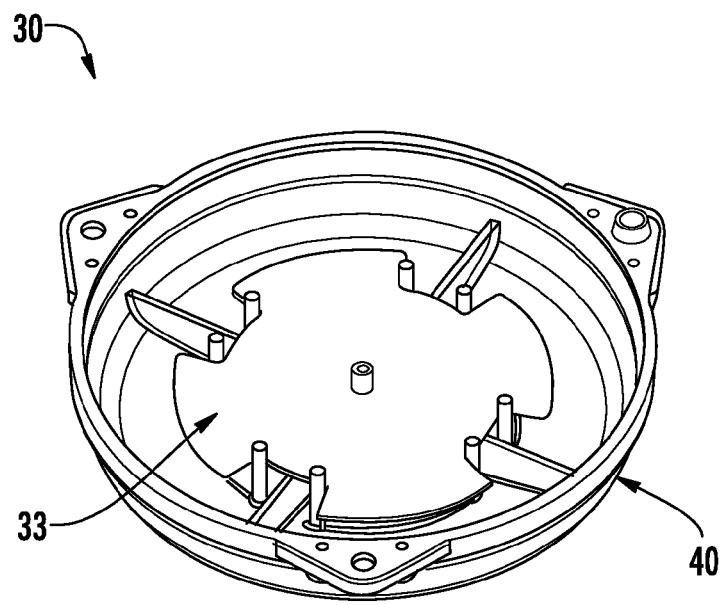
FIG. 3 depicts an assembled view of an example patch antenna reflector mounted in a radome, according to an example embodiment of the present invention.
Figure 4:
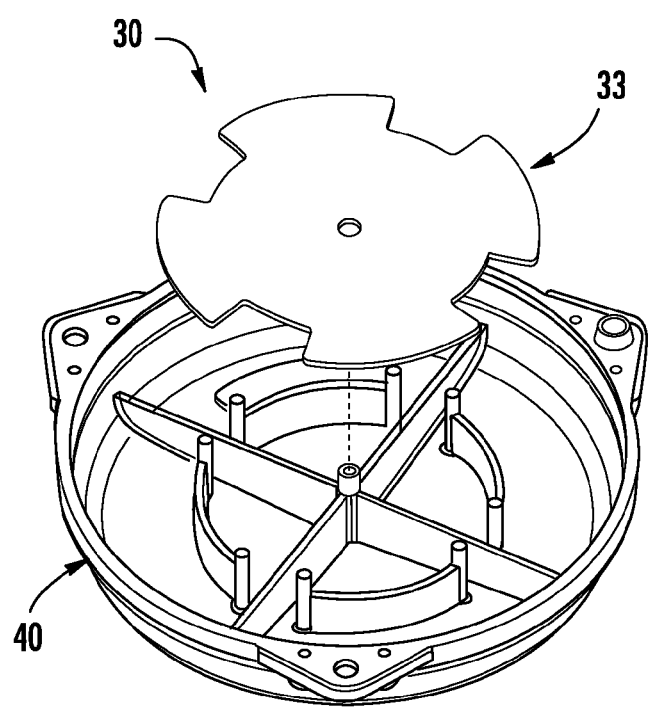
FIG. 4 depicts an exploded view of the example patch antenna reflector and the radome, according to an example embodiment of the present invention.

FIG. 3 depicts an assembled view of an example reflector 33 mounted in a radome 40 of the patch antenna 30, according to an example embodiment of the present invention. FIG. 4 depicts an exploded view of the example reflector 33 and the radome 40 of the patch antenna 30, according to an example embodiment of the present invention.

The patch antenna 30 is sensitive to signals within an L-Band RF range and operable for providing a gain to the RF signals. The reflector 33 comprises a metallic material of a characteristic dimension and is operable for shaping a pattern of the RF gain of the patch antenna 30. The reflector 33 is operable for shaping a pattern of the RF gain of the patch antenna. Further, the transceiver comprises at least one PCBA.

FIG. 5 depicts an exploded view of a portion of the example terrestrial transceiver 50, according to an example embodiment of the present invention. An 'H1' PCB 52 is operable for providing a ground plane 521 for the antenna 30. The ground plane is disposed over a surface of a dielectric substrate 521. A radiating element ("Rad.") 555 is disposed on the 'H1' PCB of the patch antenna 50.

FIG. 6A depicts a top view of an example 'H1' PCB 52, according to an example embodiment of the present invention. FIG. 6B depicts a lateral view of the example 'H1' PCB 52, according to an example embodiment of the present invention. FIG. 6C depicts a view of the example PCB partly from a side and partly from the top, according to an example embodiment of the present invention.

The 'H1' PCBA 52 comprises a dielectric substrate 521 and at least one electronic component, such as the radiating element 555 disposed upon the dielectric substrate 521. The substrate 521 is penetrated by a hole 66. The hole 66 penetrates a central region of the dielectric substrate 521 in which it is substantially disposed. Based on the configured dimension characteristic of the reflector 33, and on a positioning and/or a dimension of the hole 66, the RF gain diverges over an angle from a boresight of the patch antenna 30. The transceiver 50 may also comprise an antenna spacer 53.

FIG. 7A depicts a top view of the example antenna spacer 53, according to an example embodiment of the present invention. The modem PCBA 56 and/or the modem 555 may be electrically and mechanically coupled to a component of the antenna spacer 53. FIG. 7B depicts a lateral view of the example antenna spacer 53, according to an example embodiment of the present invention. The antenna spacer 53 is operable for providing electrical insulation between the modem 550 and a ground plane 533 of the patch antenna 30.

The modem comprises one or more electronic components 550 disposed on a modem PCBA 56, which may be disposed within a housing or cover 59.

FIG. 8 depicts an exploded view of the example terrestrial transceiver 50, according to an example embodiment of the present invention.

In FIG. 6B and FIG. 6C and FIG. 8, the modem PCBA 56 is shown disposed over one (e.g., lower) surface of the 'H1' PCBA 52. The modem 56 is operable for modulating signals to the antenna 30, which may be radiated by the radiating element 555 and the reflector 33. The modem is also operable for demodulating signals received by the antenna from the satellites of the constellation 125.

The terrestrial transceiver 50 may also comprise a coupler assembly 557. The coupler assembly 557 comprises a pair of pins 51, each comprising a conductive material. The pair of pins 51 is operable for coupling signals within the RF range between the patch antenna 30 and the radiating element 555 of the 'H1' PCBA 52.

The coupler assembly also comprises a screen cover 54. The screen cover 54 comprises a conductive material and is operable for providing a ground connection between the modem 550 and a ground plane 533 of the patch antenna 30. Further, the coupler assembly comprises a screen spacer 55, which comprises a dielectric material. The screen spacer 55 is operable for providing electrical insulation and mechanical support for the screen cover 54.

The radiating element 555 comprises a component operable for providing a first linear excitation to a first port of a pair of ports, a second linear excitation to a second port of the pair of ports wherein the second linear excitation is provided in a quadrature relationship to the first port of the pair.

A circular polarization pattern is imparted to the patch antenna 30 by the quadrature pair of excitations. In an example embodiment, a left-handed polarization of the antenna is rejected over low elevation angles within the RF operating range of the antenna. An example embodiment may be implemented in which the radiating element 555 comprises a power divider such as a Wilkinson splitter.

Power coupling characteristics of the example transceiver 30 may be represented in power spectra corresponding to various frequency ranges. The power spectra may be computed, predicted, modeled, measured, and/or monitored in relation to an implementation of the example transceiver 30.

Figure 9A:
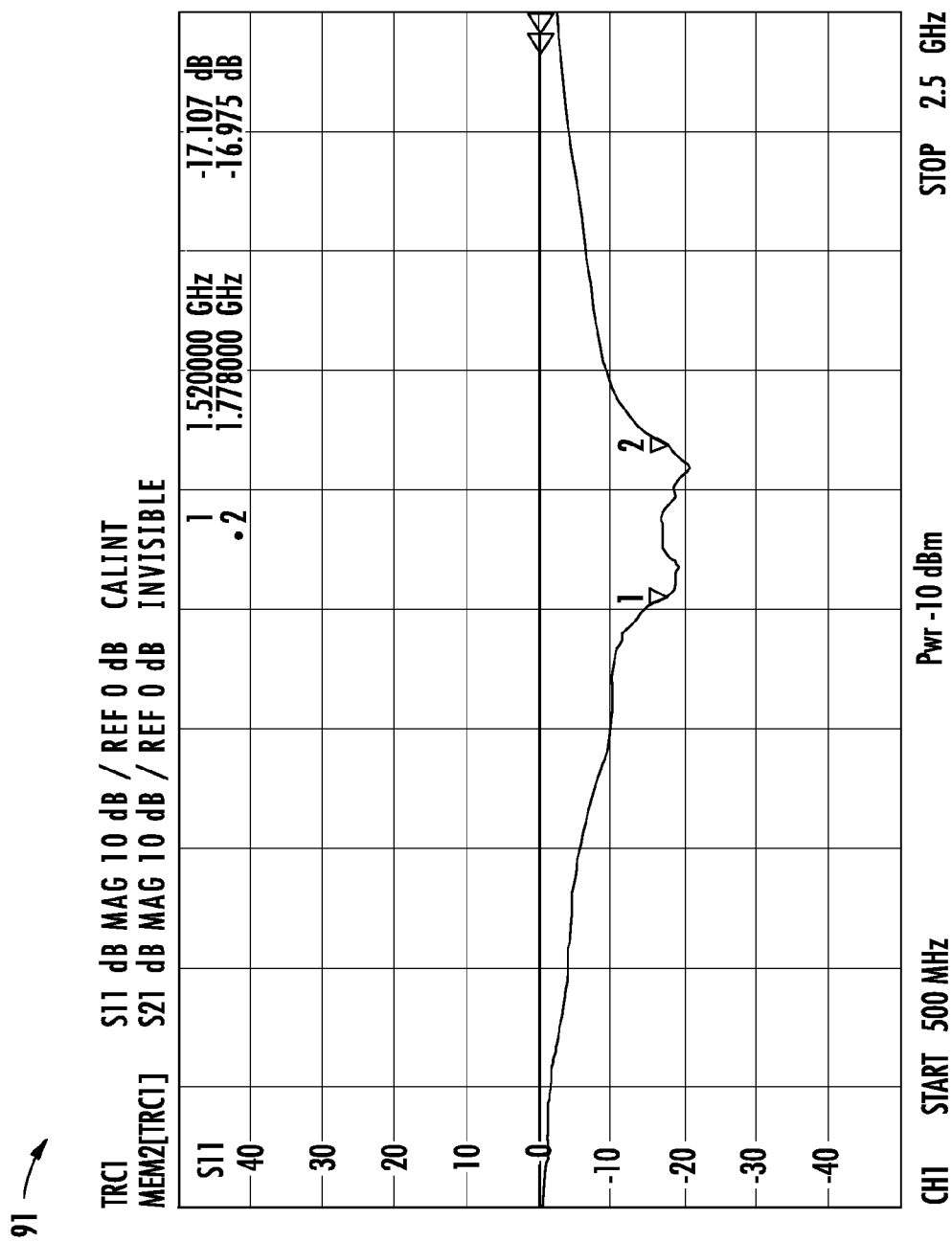
FIG. 9A depicts a first example antenna power spectrum, according to an example embodiment of the present invention.

FIG. 9A depicts a first example antenna power spectrum 91, according to an example embodiment of the present invention. The power spectrum 91 represents the power coupled by the antenna 30 over a frequency range extending from 500 MHz to 2.5 GHz, inclusive.

Figure 9B:
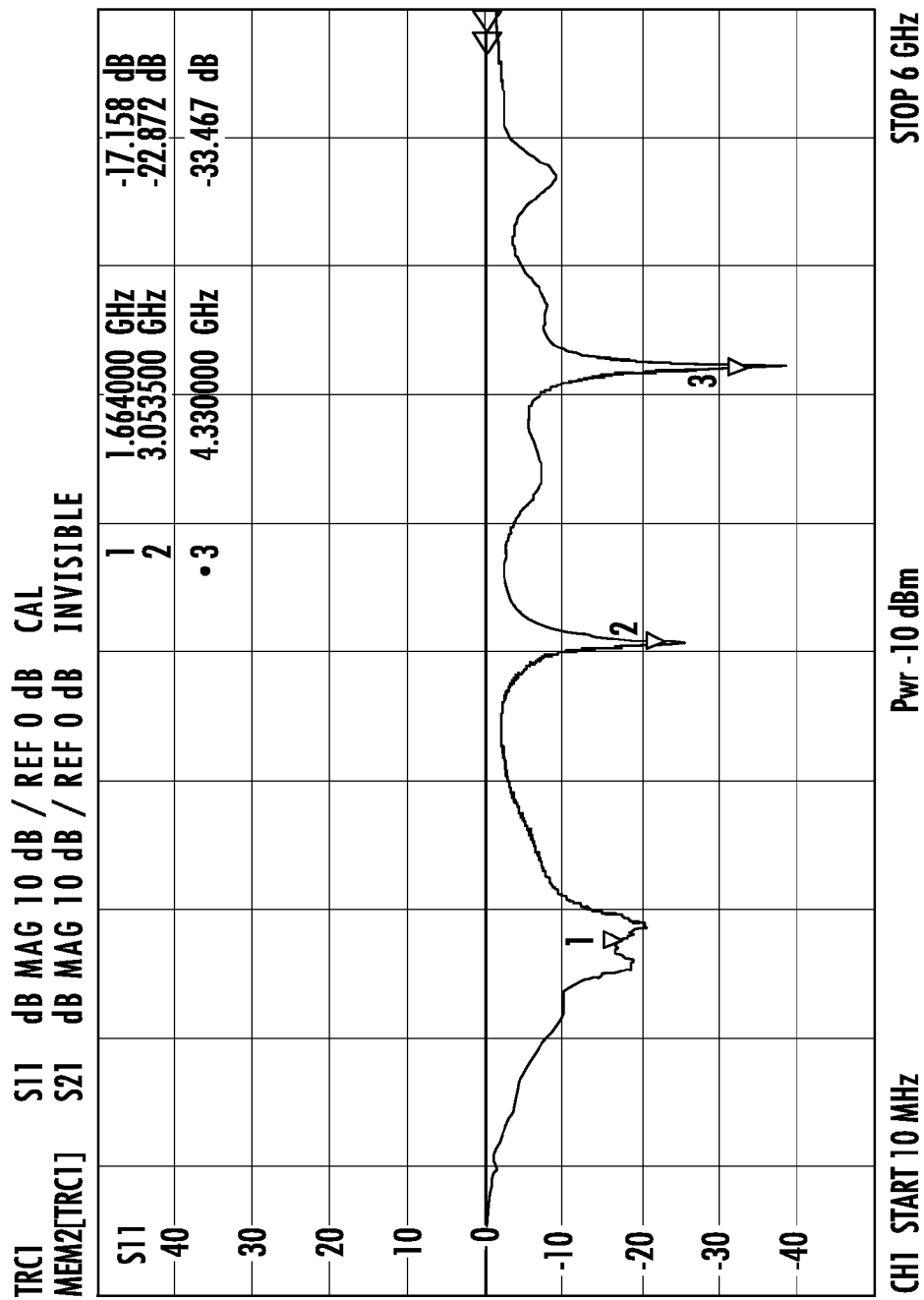
FIG. 9B depicts a second example antenna power spectrum, according to an example embodiment of the present invention.

FIG. 9B depicts a second example antenna power spectrum, according to an example embodiment of the present invention. The power spectrum 91 represents the power coupled by the antenna 30 over a frequency range extending from 10 MHz to 6 GHz, inclusive.

Figure 10:
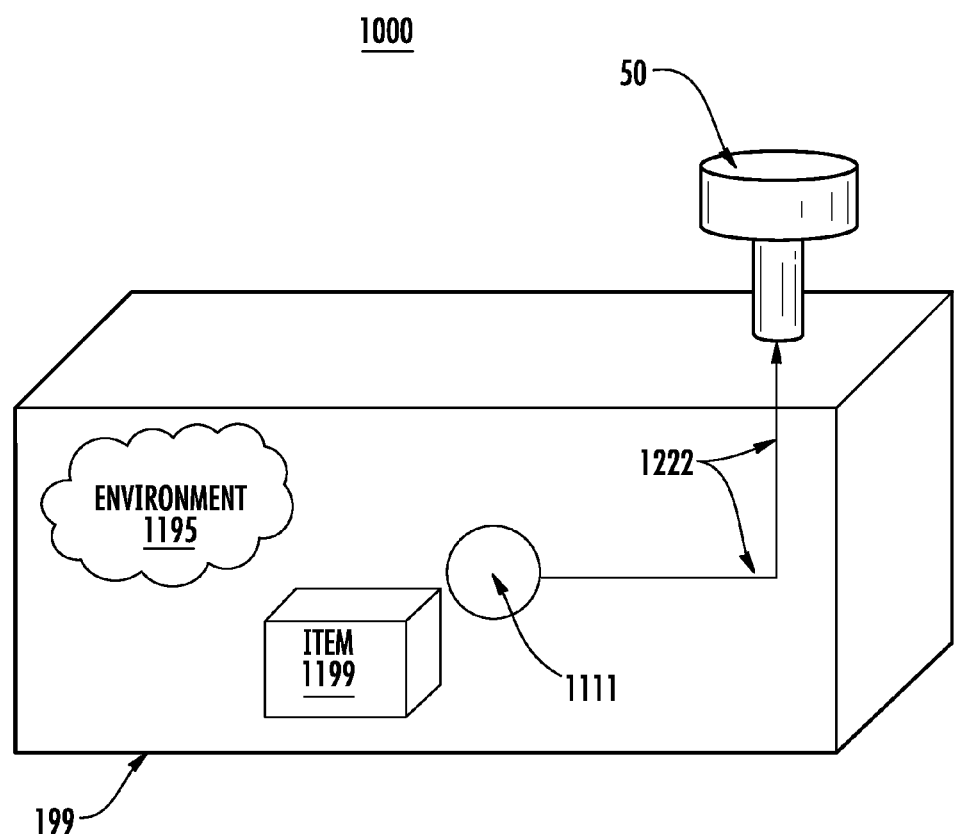
FIG. 10 depicts an example telemetry system, according to an example embodiment of the present invention.

FIG. 10 depicts an example telemetry system 1000, according to an example embodiment of the present invention. The telemetry system may comprise the terrestrial transceiver 50 and a sensor 1111. The sensor 1111 may be disposed in proximity to the tracked asset 199. The sensor 1111 may also (or alternatively) be disposed within (and/or upon an internal or external surface of) the tracked asset 199.

The sensor 1111 may comprise an array of multiple sensor components. The sensor 1111 is coupled communicatively with the transceiver 50 by a signal conductor or other wireline or wireless data link 1222. The sensor component 1111 is operable for sensing, detecting, and/or measuring one or more characteristics or parameters relating to an (e.g., internal) environment 1195 of the tracked asset 199 and/or a cargo or component item 1199 therein. The characteristics and/or parameters may relate to temperature, humidity, pressure, vibration, shock, atmospheric environmental chemistry and physics, and/or others.

The transceiver 50 may be operable for providing multi-purpose tracking and monitoring high-value tracked assets represented by the example item 199. The transceiver 50 is operable for selecting a best, or most appropriate one of the satellites 111 through 115, inclusive, of the constellation 125. The transceiver 50 may then regularly transmit its location (and thus that of the tracked asset 199) and any additional message data, which may comprise data related to outputs signals of the sensors 1111. The transceiver 50 may be implemented for use in various, e.g., external environments and may thus be deployed and used world-wide in any season.

Example Fabrication Process.

Figure 11:
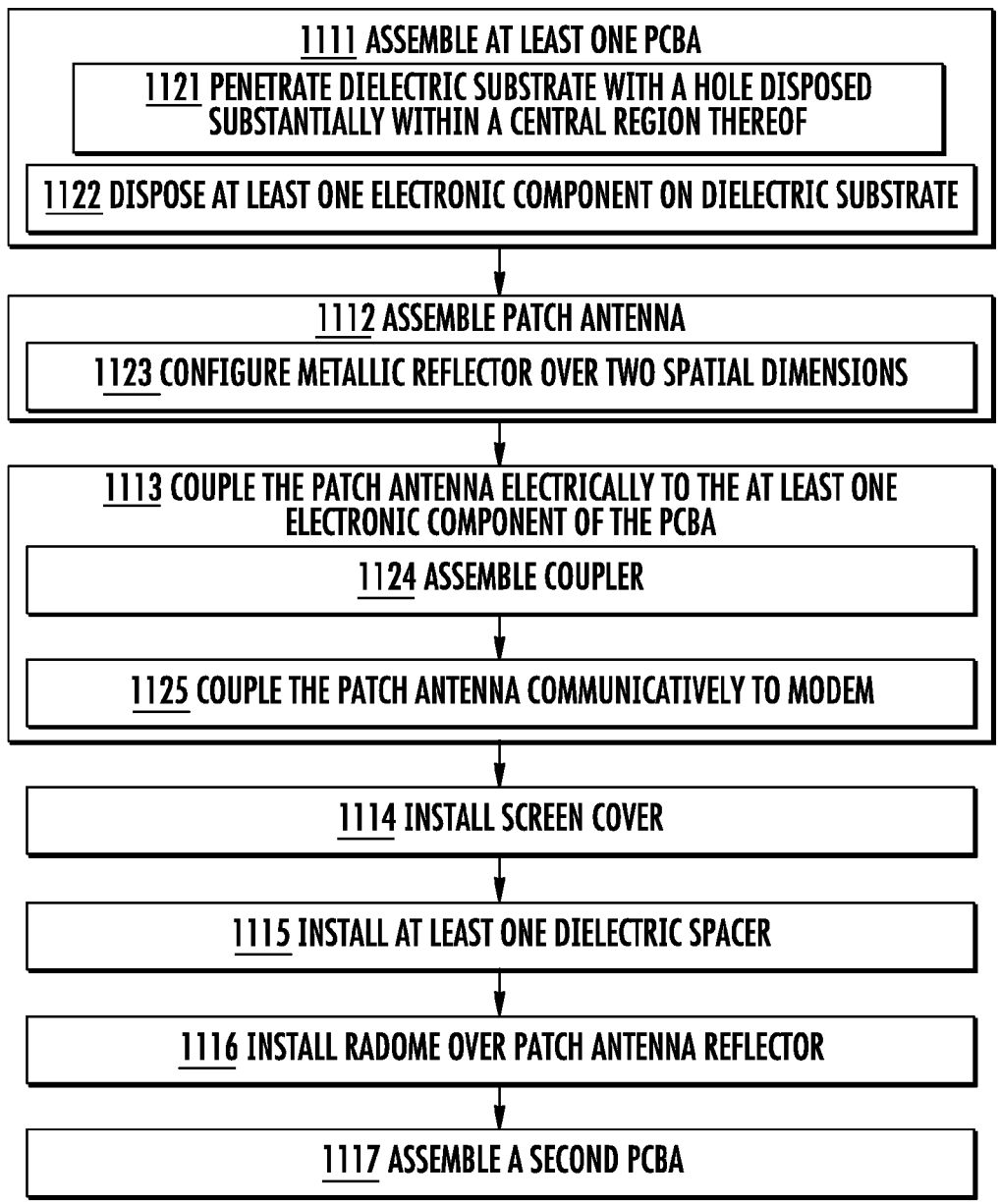
FIG. 11 depicts a flowchart for an example fabrication process, according to an example embodiment of the present invention.

An example embodiment of the present invention also relates to a method for fabricating a terrestrial satellite transceiver operable for exchanging RF signals with a satellite. FIG. 11 depicts a flowchart for an example fabrication process, according to an embodiment of the present invention.

In step 1111, at least one PCBA is assembled. The PCBA may comprise a dielectric substrate. The assembly of the at least one PCBA may comprise a step 1121 and a step 1122.

In the step 1121, the dielectric substrate is penetrated with a hole. The hole is disposed substantially within a central region of the PCBA. In step the 1122, at least one electronic component is disposed on the dielectric substrate.

In step 1112, a patch antenna is assembled. The patch antenna is sensitive to signals within an L-Band RF range and operable for providing a gain to the RF signal. The patch antenna may comprise a metallic reflector and the assembly of the patch antenna may comprise a step 1123.

In the step 1123, a shape is configured for a metallic reflector over two spatial dimensions. A frequency bandwidth characteristic of the patch antenna relates to the configured shape of the reflector. The metallic reflector is operable for shaping a pattern of the RF gain of the patch antenna. Based on the shape configured over the two dimensions of the reflector and on a positioning, and/or on a dimension of the hole disposed in the at least one PCBA, the RF gain diverges over an angle from a boresight of the patch antenna.

In step 1113, the patch antenna is coupled electrically to the at least one electronic component of the PCBA. The at least one electronic component of the PCBA may comprise a modem, and the step 1113 may comprise a step 1124 and a step 1125.

In the step 1124, a coupler is assembled. In the step 1125, the patch antenna is coupled communicatively via the assembled coupler to the modem. The modem is operable for modulating and for demodulating the RF signals. The coupling the patch antenna and the at least one electronic component of the PCBA communicatively in relation to conducting signals within the RF range between the patch antenna and the at least one electronic component of the PCBA.

In step 1114, a screen cover may be installed. The screen cover comprises a conductive material and is operable for providing a ground connection between the modem and a ground plane of the patch antenna.

In step 1115, at least one spacer comprising a dielectric material may be installed. The at least one dielectric spacer may comprise an antenna spacer operable for providing an electrical insulation between the modem and the ground plane of the patch antenna. The at least one spacer may also (or alternatively) comprise a screen spacer operable for providing an electrical insulation and/or a mechanical support for the screen cover.

In step 1116, a radome may be installed over the patch antenna, e.g., over the metallic reflector thereof. In an example embodiment, the radome may be installed over the antenna reflector using a technique related to heat staking. The radome comprises a material such as a plastic, which is transparent to the RF radiation and operable for protectively housing the patch antenna within an operating environment of the transceiver. The reflector is suspended within the radome.

In step 1115, at least one spacer comprising a dielectric material may be installed. The at least one dielectric spacer may comprise an antenna spacer operable for providing an electrical insulation between the modem and the ground plane of the patch antenna. The at least one spacer may also (or alternatively) comprise a screen spacer operable for providing an electrical insulation and/or a mechanical support for the screen cover.

In step 1116, a radome may be installed over the patch antenna, e.g., over the metallic reflector thereof. In an example embodiment, the radome may be installed over the antenna reflector using a technique related to heat staking. The radome comprises a material such as a plastic, which is transparent to the RF radiation and operable for protectively housing the patch antenna within an operating environment of the transceiver. The reflector is suspended within the radome.

In a step 1117, a second PCBA may be assembled. The second PCBA operable for providing a ground plane for the patch antenna and comprising a radiating element coupled to the patch antenna and operable for radiating the RF signals thereto. The second PCBA may comprise a dielectric substrate and is operable for insulating the patch antenna electrically.

An example embodiment of the present invention relates to a terrestrial transceiver product, which is implemented by a process such as the fabrication process 1100. The fabrication process 1100 is described by way of illustration and is not intended to reflect any limitation or restriction to implementing example embodiments of the present invention. On the contrary, example embodiments of the present invention are well suited to implementation using an alternative (or additional) method, which is reflected by the fabrication process 1100.

Example embodiments may be implemented in which the steps 1111 through 1117 (inclusive) and/or the steps 1121 through 1125 (inclusive) are performed without respect to any particular order or sequence. An example embodiment may also (or alternatively) be implemented in which one or more of the steps 1111 through 1117 (inclusive) and/or the steps 1121 through 1125 (inclusive) are optional or omitted, and/or with one or more additional (or alternative) steps.

Use of the suspended reflector 33 simplifies and reduces costs related to fabrication of antenna products, and transceiver products comprising the antenna product relative to conventional antennas and transceivers, which use an additional PCB instead. Shaping of the reflector 33 provides sufficient frequency bandwidth. The shaping of the reflector 33 allows efficient and economical compatibility with material tolerances related to the 'H1' PCBA 52, which may also allow economical implementation of the substrate 521. The suspension of the reflector 33 within the radome 40 allows also the simplification of assembly related to its incorporation it in the radome 40, and its attachment, which may relate to use of economical heat staking techniques.

In an example embodiment, the hole 66 penetrating the 'H1' PCBA 52 (and the configured shape of the reflector 33) provide gain over a wide angle from boresight of the antenna 30. Thus, the transceiver 50 is operable for providing transceiver functionality for geostationary satellite communications from all locations on earth. An example embodiment is implemented in which the hole 66 penetrating the middle of the substrate 521 of the 'H1' PCBA 52, and fine-tuning the dimensions of the patch antenna 30 and the reflector element 33. Example embodiments are implemented which substantially reject left-hand polarization for low elevation angles in operating bands of the transceiver 50, and thus ameliorates signal interference due to fading introduced by signals reflecting on the ground.

In an example embodiment, use of the Wilkinson splitter, e.g., as a power divider and/or as a component of the radiating element 555, economically provides the dual RF feed with a 90 degree phase shift on the 'H1' PCBA 52, which obviates at least one additional PCB and related complexity and cost relative to typical transceivers. Further, use of the pins 51, screen cover 54, and antenna spacer 53 to configure the coupler 557 for coupling the antenna 30 to the electronic component(s) of the 'H1' PCBA 52 obviates use of coaxial cable and related additional cost, impedance, and/or signal related rise time, which could restrict bandwidth.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;

U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;

U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;

U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.); U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention thus relate to a satellite transceiver antenna 30 that provides significant gain over a wide angle from its boresight (axis of maximum radiated power), and globally over a wide range of terrestrial locations world-wide for exchanging signals from geostationary communication satellites. An example embodiment relates to implementing a satellite transceiver 50 antenna 30 with right-hand circular polarization, which avoids interference associated with left-hand polarization. Further, example embodiments of the present invention reduce complexity and costs related to components and fabrication of the satellite transceiver antenna, relative to existing conventional approaches.

An example embodiment of the present invention is thus described in relation to a terrestrial transceiver 50, which is operable for exchanging RF signals with one or more communication satellites (e.g., of the constellation 125). The terrestrial transceiver 50 comprises a patch antenna 30 sensitive to signals within an L-Band RF range and operable for providing a gain to the RF signals. The patch antenna 30 comprises a reflector 33. The reflector 33 comprises a metallic material of a characteristic dimension and is operable for shaping a pattern of the RF gain of the patch antenna 30. Further, the transceiver comprises at least one PCBA (e.g., 'H1' PCBA 52).

Example embodiments of the present invention also relate to methods (e.g., process 1100) for fabricating terrestrial transceivers, which are operable for exchanging RF signals with one or more communication satellites, a transceiver product (e.g., transceiver 50) fabricated by the example process, and a satellite communication network comprising the example transceiver.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A transceiver, the transceiver comprising:
a patch antenna sensitive to signals within an L-Band RF range, the antenna comprising a metallic reflector;
at least one printed circuit board assembly (PCBA) comprising a dielectric substrate, at least one electronic component disposed upon the dielectric substrate, and a hole penetrating the dielectric substrate;

a modulator/demodulator (modem) communicatively coupled to the patch antenna and operable for modulating and for demodulating RF signals; and a coupler assembly, wherein the coupler assembly comprises:

a pair of pins, each comprising a conductive material, wherein the pair of pins is operable for coupling signals within an RF range between the patch antenna and the at least one electronic component of the at least one PCBA;

a screen cover comprising a conductive material and operable for providing a ground connection between the modem and a ground plane of the patch antenna; and at least one spacer comprising a dielectric material.

2. The transceiver as described in claim 1 wherein the at least one spacer comprises one or more of:

an antenna spacer operable for providing an electrical insulation between the modem and the ground plane of the patch antenna; or a screen spacer operable for providing one or more of an electrical insulation, or a mechanical support for the screen cover.

3. The transceiver as described in claim 1, further comprising a radome, the radome comprising a material transparent to RF radiation and operable for protectively housing the patch antenna within an operating environment of the transceiver, wherein the reflector is suspended within the radome.

4. The transceiver as described in claim 3 wherein the metallic material of the suspended reflector comprises a stamped metal.

5. The transceiver as described in claim 3 wherein the characteristic dimension of the suspended reflector comprises a shape configured over two spatial dimensions and wherein a frequency bandwidth characteristic of the patch antenna relates to the configured shape of the suspended reflector.

6. The transceiver as described in claim 1, further comprising a component operable for providing a first linear excitation to a first port of a pair of ports, a second linear excitation to a second port of the pair of ports wherein the second linear excitation is provided in a quadrature relationship to the first port of the pair, wherein a circular polarization pattern is imparted to the antenna.

7. The transceiver as described in claim 6 wherein a left-handed polarization of the antenna is rejected over low elevation angles within the RF operating range of the antenna.

8. The transceiver as described in claim 6 wherein the component operable for providing a first linear excitation and the second linear excitation comprises a splitter.

9. The transceiver as described in claim 8 wherein the splitter comprises a Wilkinson splitter.

10. The transceiver as described in claim 6 wherein the at least one electronic component disposed upon the dielectric substrate of the at least one PCBA comprises the component operable for providing the first linear excitation and the second linear excitation.

11. The transceiver as described in claim 1, further comprising at least a second PCBA.

12. The transceiver as described in claim 11 wherein the at least second PCBA comprises one or more of:

a PCB operable for providing a ground plane for the patch antenna and comprising a radiating element coupled to the patch antenna and operable for radiating RF signals thereto; or a PCB comprising a substrate, the substrate comprising a dielectric material and operable for insulating the patch antenna electrically.

13. A method for fabricating a terrestrial satellite transceiver, the method comprising the steps of:

assembling at least one printed circuit board assembly (PCBA), the assembly of the PCBA comprising penetrating a dielectric substrate with a hole and disposing at least one electronic component on the dielectric substrate;

configuring a shape of a metallic reflector over two spatial dimensions;

attaching a patch antenna comprising the configured metallic reflector to the at least one PCBA, the patch antenna sensitive to signals within an L-Band RF range;

coupling a modulator/demodulator (modem) communicatively to the patch antenna, the modem operable for modulating and for demodulating RF signals;

assembling a coupler assembly, wherein the assembly of the coupler assembly comprises the steps of:

coupling the patch antenna and the at least one electronic component of the PCBA communicatively in relation to conducting signals within an RF range between the patch antenna and the at least one electronic component of the PCBA;

installing a screen cover comprising a conductive material and operable for providing a ground connection between the modem and a ground plane of the patch antenna; and installing at least one spacer comprising a dielectric material wherein the at least one spacer comprises one or more of:

an antenna spacer operable for providing an electrical insulation between the modem and the ground plane of the patch antenna; or a screen spacer operable for providing one or more of an electrical insulation, or a mechanical support for the screen cover.

14. The fabrication method as described in claim 13, further comprising installing a radome over the patch antenna using a heat staking related process step, the radome comprising a material transparent to RF radiation and operable for protectively housing the patch antenna within an operating environment of the transceiver, wherein the reflector is suspended within the radome.

15. The fabrication method as described in claim 13, further comprising one or more of:

assembling a PCBA operable for providing a ground plane for the patch antenna and comprising a radiating element coupled to the patch antenna and operable for radiating RF signals thereto; or assembling a PCB comprising a substrate, the substrate comprising a dielectric material and operable for insulating the patch antenna electrically.

16. A satellite communication network, the network comprising:

a satellite constellation, the satellite constellation comprising a plurality of communication satellites, each of the communication satellites deployed in a geostationary earth orbit (GEO); and one or more terrestrial transceivers, the one or more terrestrial transceivers comprising:

a patch antenna sensitive to signals within an L-Band RF range, the patch antenna comprising a metallic reflector;

at least one printed circuit board assembly (PCBA) comprising a dielectric substrate, at least one electronic component disposed upon the dielectric substrate, and a hole penetrating the dielectric substrate;

a modulator/demodulator (modem) communicatively coupled to the patch antenna and operable for modulating and for demodulating RF signals; and a coupler assembly, wherein the coupler assembly comprises:

a pair of pins, each comprising a conductive material, wherein the pair of pins is operable for coupling signals within an RF range between the patch antenna and the at least one electronic component of the at least one PCBA;

a screen cover comprising a conductive material and operable for providing a ground connection between the modem and a ground plane of the patch antenna; and at least one spacer comprising a dielectric material.

\* \* \* \* \*